(12) United States Patent
Jin et al.

(10) Patent No.: US 10,657,678 B2
(45) Date of Patent: May 19, 2020

(54) METHOD, APPARATUS AND DEVICE FOR CREATING A TEXTURE ATLAS TO RENDER IMAGES

(71) Applicant: Alibaba Group Holding Limited, George Town (KY)

(72) Inventors: Decai Jin, Hangzhou (CN); Xu Zeng, Shanghai (CN); Qinghe Xu, Shanghai (CN)

(73) Assignee: Alibaba Group Holding Limited (KY)

( * ) Notice: Subject to any disclaimer, the term of this patent is extended or adjusted under 35 U.S.C. 154(b) by 0 days.

(21) Appl. No.: 16/128,202

(22) Filed: Sep. 11, 2018

(65) Prior Publication Data

US 2019/0080489 A1 Mar. 14, 2019

Related U.S. Application Data

(63) Continuation-in-part of application No. PCT/CN2017/075467, filed on Mar. 2, 2017.

(30) Foreign Application Priority Data

Mar. 15, 2016 (CN) .......................... 2016 1 0146095

(51) Int. Cl.
*G06T 15/04* (2011.01)
*G06T 11/00* (2006.01)
*G06T 11/60* (2006.01)

(52) U.S. Cl.
CPC ............ *G06T 11/001* (2013.01); *G06T 11/60* (2013.01); *G06T 15/04* (2013.01)

(58) Field of Classification Search
CPC ......... G06T 11/001; G06T 11/60; G06T 7/40; G06T 15/04
See application file for complete search history.

(56) References Cited

U.S. PATENT DOCUMENTS

| 7,283,140 | B2 | 10/2007 | Zhou |
| 7,889,205 | B1 | 2/2011 | Parenteau |
| 2013/0063463 | A1 | 3/2013 | Clark |
| 2017/0278293 | A1 | 9/2017 | Hsu |
| 2018/0144535 | A1 | 5/2018 | Ford |

FOREIGN PATENT DOCUMENTS

| CN | 102289665 | | 12/2011 |
| CN | 102663801 | A | 9/2012 |
| CN | 103337072 | | 10/2013 |
| CN | 104054112 | A | 9/2014 |
| CN | 105023234 | A | 11/2015 |
| CN | 105205866 | | 12/2015 |

*Primary Examiner* — Antonio A Caschera
(74) *Attorney, Agent, or Firm* — Van Pelt, Yi & James LLP

(57) ABSTRACT

A method, device, and system for rending images. The method includes obtaining, by one or more processors, image data comprised in a data frame to be rendered, determining, by the one or more processors, one or more dimensions for a texture atlas based at least in part on the dimensions of the obtained image data, creating, by the one or more processors, the texture atlas based at least in part on the determined dimensions, and rendering, by the one or more processors, the data frame based at least in part on the texture atlas.

23 Claims, 6 Drawing Sheets

300

METHOD, APPARATUS AND DEVICE FOR CREATING A TEXTURE ATLAS TO RENDER IMAGES

CROSS REFERENCE TO OTHER APPLICATIONS

This application is a continuation-in-part of and claims priority to International (PCT) Application No. PCT/CN2017/075467 entitled METHOD, APPARATUS AND DEVICE FOR CREATING TEXTURE ATLAS AND TEXTURE ATLAS WAIT SET, filed Mar. 2, 2017 which is incorporated herein by reference for all purposes, which claims priority to China Application No. 201610146095.7 entitled METHOD, DEVICE, AND EQUIPMENT FOR CREATING TEXTURE ATLASES AND TEXTURE ATLAS WAIT SETS, filed Mar. 15, 2016 which is incorporated herein by reference for all purposes.

FIELD OF THE INVENTION

The present invention relates to the field of computer application technology. In particular, the present invention relates to a method, device, and system for creating texture atlases and texture atlas wait sets.

BACKGROUND OF THE INVENTION

Texture is an important visual effect. In the context of computer graphics, texture simultaneously includes both the usual sense of uneven grooves exhibited by an object and the color patterns of the smooth surfaces of an object. In connection with rendering each image, a graphics engine generally creates texture with respect to a number of pieces of image data included in each image. Accordingly, the creation of texture for an image to be rendered by a terminal generally requires significant memory and processing resources. For example, when allocating memory space for the data of each image, for computational and memory management efficiency reasons, the memory space to be allocated is determined to be a bit value that is greater than or equal to the size of the image and is the power of two (e.g., 2048 bytes, 4096 bytes, 8192 bytes, etc.; a gray image size of 32×64 requires 32*64*1 byes). Such conventional allocation of memory space for image rendering results in a significant waste of memory resources.

In order to reduce memory waste caused by the use of texture in the rendering of an image, texture can be pieced together into one large texture map, which is referred to as a texture atlas. As an example, a texture atlas is an image comprising a collection of smaller images (e.g., sub-images) that are combined. The sub-images can be uniformly sized or can vary in size. The use of a texture atlas to process all of the images at one time conserves memory and increases rendering speed. For example, the combination of smaller images to form the texture atlas can re-use sub-images as constituent smaller images of the texture atlas. As an example, the sub-images that are re-used can exhibit a texture that is used in a plurality of portions of the image corresponding to the texture atlas. As another example, the sub-images that are re-used can be pre-stored and used in creating the texture for an image.

According to conventional art, in connection with a graphics engine creating texture atlases, the graphics engine uses static texture atlases (e.g., texture atlases having fixed dimensions), and the dimensions of the static texture atlases generally has a power of two. However, if the dimensions of the static texture atlas used in creating a texture atlas are too large and all of the image data contained in one frame (e.g., a reference to the image to be rendered) does not entirely fill the texture atlas, memory would be wasted. Conversely, if the static texture atlas that is used in creating the texture atlas has dimensions that are too small, the texture atlas may be unable to hold all of the image data for a frame (e.g., because too many sub-images are required to form the texture atlas and not all the required sub-images can fit in texture atlas). As a result, the remaining image data can only be processed by means other than the texture atlas (e.g., via rendering using ordinary texture methods). The use of other means to process the remaining image data (e.g., via rendering using ordinary texture methods) can result in an excessive number of rendering commands and a degradation in rendering performance.

In view of the above, there is a need for an implementation of creating a texture atlas in connection with efficient rendering of images.

BRIEF DESCRIPTION OF THE DRAWINGS

Various embodiments of the invention are disclosed in the following detailed description and the accompanying drawings.

DETAILED DESCRIPTION

Figure 1:
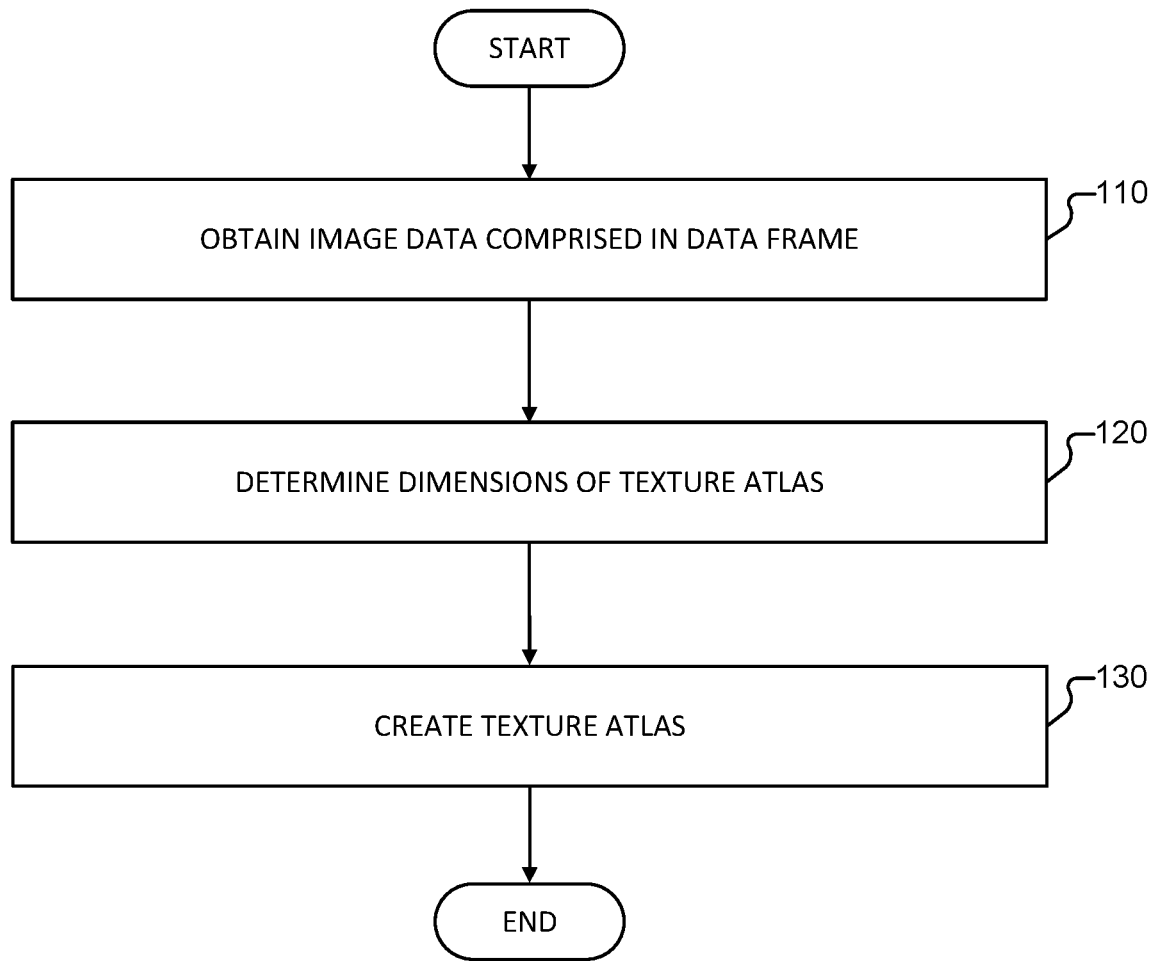
FIG. 1 is a flowchart of a method for creating a texture atlas according to various embodiments of the present application.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

In order to make the purpose, technical solution, and advantages of the present invention even clearer, the present invention is described in detail below in light of the drawings and specific embodiments.

The terms used in the embodiments of the present invention are only intended for the purpose of describing specific embodiments, and are not intended to limit the present invention. Terms used in the embodiments of the present invention and the attached claims in the singular form, such as "a," "said," and "this," are also intended to include plural forms, unless another meaning is clearly expressed by the context.

It should be understood that the term "and/or" used in this document merely represents an association relationship that describes associated objects, used to express the possibility of the existence of three types of relationships. For example, A and/or B can express three situations: A exists alone, A and B exist concurrently, or B exists alone. In addition, the character "/" in this document generally expresses an "or" relationship between the former and latter associated objects.

Depending on context, if the word "if" is used here, it can be interpreted as "in the event of" or "when" or "in response to determining" or "in response to detecting." Similarly, depending on context, the phrase "if it is determined that" or "if it is detected that (a stated condition or event)" can be interpreted as "when it is determined that" or "in response to determining that" or "when it is detected that (a stated condition or event)" or "in response to detecting that (a stated condition or event)."

As used herein, a terminal generally refers to a device comprising one or more processors. A terminal can be a device used (e.g., by a user) within a network system and used to communicate with one or more servers. According to various embodiments of the present disclosure, a terminal includes components that support communication functionality. For example, a terminal can be a smart phone, a server, a machine of shared power banks, information centers (such as one or more services providing information such as traffic or weather, etc.), a tablet device, a mobile phone, a video phone, an e-book reader, a desktop computer, a laptop computer, a netbook computer, a personal computer, a Personal Digital Assistant (PDA), a Portable Multimedia Player (PMP), an mp3 player, a mobile medical device, a camera, a wearable device (e.g., a Head-Mounted Device (HMD), electronic clothes, electronic braces, an electronic necklace, an electronic accessory, an electronic tattoo, or a smart watch), a kiosk such as a vending machine, a smart home appliance, vehicle-mounted mobile stations, or the like. A terminal can run various operating systems.

A terminal can have multimedia functions. A terminal can support audio, video, data, and other such functions. The terminal can have a touchscreen. Various operating systems such as Android, iOS, YunOS, and tvOS can be implemented on the terminal. A terminal can be connected to one or more networks such as the Internet, a WiFi network, a Local Area Network (LAN), a Wide Area Network (WAN), a telecommunications network, etc.

A terminal can be connected to one or more peripherals (e.g., smart peripherals). For example, the terminal can be connected to one or more peripherals via a Bluetooth connection, a WiFi direct connection, an infrared connection, a ZigBee connection, a Bluetooth Low Energy (BLE) connection, a WiMax connection, a Low Power Radio (LPR) connection, a Near Field Communications (NFC) connection, etc.

FIG. 1 is a flowchart of a method for creating a texture atlas according to various embodiments of the present application.

Referring to FIG. 1, process 100 for creating a texture atlas is provided. Process 100 can be implemented in connection with process 200 of FIG. 2, texture atlas wait set 300 of FIG. 3A, texture atlas wait set 325 of FIG. 3B, and/or texture atlas wait set 350 of FIG. 3C. Process 100 can be implemented at least in part by computer system 400 of FIG. 4. For example, process 100 can be implemented at least in part by an application or process running on computer system 400 of FIG. 4.

According to various embodiments, process 100 is invoked in response to a determination that one or more images (or objects, elements, etc.) are to be rendered. In some embodiments, process 100 is invoked to determine the texture atlas quantity and the size of the texture atlas in the frame.

At 110, image data comprised in a data frame is obtained. The image can be a local image file (e.g., a local png/jpeg file), or an image obtained from a link (e.g., a URL from a web page, etc.). The image can be read or obtained from the location corresponding to the file (e.g., the local address at which the image is stored, or the link associated with the remote address of the image). The data frame can correspond to an image to be displayed by a terminal. In some embodiments, the image data that is obtained corresponds to image data that is used in connection with rendering the data frame (e.g., the corresponding image). The image data comprised in the data frame can be obtained from the corresponding image file. In some embodiments, the image data comprised in the data frame is obtained in connection with the terminal rendering the image. For example, in response to the terminal determining that an image is to be displayed, the terminal can obtain an image corresponding to the image, and can obtain the image data comprised in the data frame. The terminal can determine that an image is to be displayed based on an input received from a user, an instruction obtained from an application running on the terminal, etc.

According to various embodiments, a data frame to be rendered comprises a plurality of pieces of image data. As an example, one or more are included on a particular user interface (UI) to be rendered, and each icon included in the UI can correspond to one piece of image data. In some embodiments, the obtaining of the image data comprised in a data frame comprises obtaining image data for each object to be displayed on a screen of the terminal (e.g., each object or element provided on a user interface, etc.).

According to various embodiments, the obtained image data comprises data that is to be used in connection with creating a texture atlas for the image (e.g., the object, element, etc.) to be rendered. The image data that is obtained can comprise image data that is to be added to the texture atlas. The image data required for creating the texture atlas (e.g., to be added to the texture atlas) can be obtained from among the image data contained in the data frame to be rendered. In some embodiments, all of the various pieces of image data comprised in the data frame to be rendered correspond to the image data to be added to the texture atlas (e.g., the image data that is required to be added to the texture atlas). In some embodiments, because some image data corresponding to the image to be rendered has relatively large dimensions, adding such image data to a texture atlas is inefficient and wastes memory and processing resources. Accordingly, in some embodiments, the terminal determines a set of image data of the image data that is obtained and that corresponds to an image to be rendered. The determined set of image data can correspond to a set of image data to be used in connection with generating the texture atlas. For example, the determined set of image data can be added to the texture atlas in connection with rendering the image. In some embodiments, the set of image data is determined based at least in part on one or more dimensions corresponding to the image data (e.g., the dimensions of each piece of image data). For example, the terminal determines image data having dimensions less than or equal to a preset dimension threshold to be the image data that is to be added to the texture atlas. In some embodiments, the preset dimension threshold can be set by the application. The preset dimension threshold can be set according to settings or preferences of the application developer, the terminal manufacture, the user, an administrator, etc. In some embodiments, the preset dimension threshold is 512 (e.g., 512 bytes). The preset dimension threshold can be set according to an environment of the terminal (e.g., the threshold can be updated based on a context of the terminal). Each piece of image data comprised in the set of image data can correspond to image data having dimensions less than or equal to the preset dimension. The image data that satisfies the condition associated with the preset dimension threshold (e.g., having a dimension less than or equal to the preset dimension threshold) can be deemed to be image data that is required to be added to the texture atlas (e.g., for rending the image).

According to various embodiments, texture atlases are used in connection with rendering relatively small images (e.g., images having a size below a preset size threshold). In some embodiments, relatively large images (e.g., images having a size above a preset size threshold) are used as textures directly (e.g., rendered from the image without using a texture atlas).

In some embodiments, image data that does not satisfy the condition associated with the preset dimension threshold (e.g., having a dimension less than or equal to the preset dimension threshold) can be deemed to be image data that is not required to be added to the texture atlas (e.g., for rending the image). For example, image data having dimensions that are greater than the preset dimension threshold can be deemed as image data that is not to be added to the texture atlas. The image data having one or more dimensions that are greater than the preset dimension threshold can be determined to not be required to create the texture atlas. Ordinary texture can be created for image data that does not need to be added to the texture atlas. For example, other conventional methods for generating texture can be used to obtain texture for image data that is determined to not be added to the texture atlas (e.g., image data that does not satisfy the condition associated with the preset dimension threshold). As an example, if the width/height of the image is larger than 512 (e.g., bytes), the texture can be an ordinary texture. Conventional methods for generating texture corresponding to an image can include: a statistical approach (e.g., using edge detection, co-occurrence matrices, Law's texture energy measurements, and autocorrelation and power spectrum functions), and/or a structured approach that characterizes an image as repeated patterns which can then be used in generating the corresponding texture representation.

According to various embodiments, the preset dimension threshold (e.g., used in connection with determining the image data to be used to create the texture atlas) can be configurable. The preset dimension threshold can be configured based at least in part on one or more of manufacturer settings of the terminal, developer settings of an application running on the terminal, and user settings or preferences.

At 120, one or more dimensions of a texture atlas are determined. In some embodiments, the terminal determines the one or more dimensions of the texture atlas. In some embodiments, the one or more dimensions of the texture atlas are determined based at least in part on a size of the image, the image data, etc. The one or more dimensions of the texture atlas or image or image data comprises one or more of width, height, and/or size of the image. The one or more dimensions of the texture atlas can be determined based at least in part on dimensions of the obtained image data. For example, the one or more dimensions of the texture atlas are determined based at least in part on the set of image data determined to be used in connection with generating the texture atlas (e.g., the image data that satisfies the condition associated with the preset dimension threshold). The one or more dimensions of the texture atlas are determined based at least in part on one or more dimensions of constituent pieces of the image data included in the set of image data. In some embodiments, the one or more dimensions of the texture atlas comprise a size of the image data (e.g., an amount of information, a file size, a number of pixels corresponding to the image data, etc.).

According to various embodiments, image data to be used in connection with generating the texture atlas (e.g., the image data that is to be added to the texture atlas) is included in a texture atlas wait set. The texture atlas wait set can be a set in which one or more images (e.g., all images) are used in the frame. As an example, a subset of image data to be used in connection with generating the texture atlas is included in the texture atlas wait set. The one or more dimensions of the texture atlas can be determined based at least in part on the image data comprised in the texture atlas wait set. For example, the one or more dimensions of the texture atlas are determined based at least in part on tabulating the dimensions of the image data included in the texture atlas wait set. In some embodiments, a preset texture merging process is implemented to determine the dimensions of the texture atlas to be created.

According to various embodiments, one or more texture atlas wait sets can be established for each data frame. For example, one texture atlas wait set can be established for each data frame, or a plurality of texture atlas wait sets can be established. A texture atlas wait set corresponding to a data frame can be established in connection with the processing of the rendering of the data frame. A maximum capacity can be set for each texture atlas wait set. The capacity of the texture atlas wait set can be a number of images (e.g., a unit of the maximum capacity can be a quantity of images). If one texture atlas wait set is filled (e.g., if the texture atlas wait set has no remaining capacity for additional image data), then the remaining image data corresponding to a data frame can be placed in another texture atlas wait set (or a plurality of other texture wait sets).

In some embodiments, image data included in different data frames shares a texture atlas wait set. Because the texture atlas wait set uses memory, the sharing of a texture atlas wait set among the image data included in different data frames can improve efficiencies related to memory use (e.g., reduce the memory used). In some embodiments, one texture atlas can comprise only one image (e.g., at any one time).

If an existing texture atlas wait set can accommodate the current image (e.g., if the current image or corresponding image data can fit within the size of the exiting texture atlas wait set), then the current image is placed in this existing texture atlas wait set. For example, the terminal can determine a capacity of the existing texture atlas wait set (or remaining or available capacity of the existing texture atlas wait set), and determine whether a size of the current image is smaller than or equal to the available capacity of the existing texture atlas wait set. In response to determining that the available capacity of the existing texture atlas wait set is sufficient for the current image (e.g., that the current image is smaller than or the same size as an available capacity of the existing texture atlas wait set), the current image is included in the existing texture atlas wait set. In response to determining that the available capacity of the existing texture atlas wait set is not sufficient for the current image (e.g., that the current image is larger than an available capacity of the existing texture atlas wait set), the current image is not included in the existing texture atlas wait set. In some embodiments, a subset of the image data corresponding to the current image is included in the existing texture atlas wait set. For example, an available capacity of the existing texture atlas wait set can be filled with a subset of image data corresponding to the current image. In some embodiments, in response to determining that the available capacity of the existing texture atlas wait set is not sufficient for the current image (e.g., that the current image is larger than an available capacity of the existing texture atlas wait set), a new texture atlas wait set is created. The new texture atlas wait set can be created in response to determining that the existing texture atlas wait set is filled (e.g., has reached capacity). A subset of the image data corresponding to the current image (e.g., a set of image data that cannot fit within the existing texture atlas wait set) is included in the new texture atlas wait set. According to various embodiments, the use of an existing texture atlas wait set conserves memory resources.

Determining whether to include a piece of image data in an existing texture atlas wait set (or to generate a new texture atlas wait set and include the pieces of image data in the new texture atlas wait set) can be performed on a piece of image data—by piece of image data basis. For each piece of image data to be added to the texture atlas, the terminal can determine whether the existing texture atlas wait set has sufficient available capacity to include the piece of image data. If the particular piece of image data is determined to not be included in the existing texture atlas wait set (e.g., that the existing texture atlas wait set does not have sufficient capacity for the particular piece of image data), a new texture atlas wait set is created and the particular piece of image data is included in the new texture atlas wait set.

In connection with determining whether an existing texture atlas wait set can accommodate the current image, after the current image is placed in the existing texture atlas wait set, the terminal can determine whether the preset maximum capacity of the existing texture atlas wait set will be exceeded. If the preset maximum capacity of the existing texture atlas wait set is determined to be exceeded, the existing texture atlas wait set is deemed to be unable to accommodate the current image data (e.g., to have insufficient available capacity). If the preset maximum capacity of the existing texture atlas wait set is determined not to be exceeded, the existing texture atlas wait set can be deemed to be able to accommodate the current image data (e.g., to have sufficient available capacity). If the preset maximum capacity of the existing texture atlas wait set will be exceeded, the current image is comprised in a new texture atlas wait set. In some embodiments, the determination of whether the existing texture atlas wait set will be exceeded is made before placing the current image in the existing texture atlas wait set.

According to various embodiments, determining whether the preset maximum capacity of the existing texture atlas wait set will be exceeded comprises determining whether at least one dimension of the existing texture atlas wait set is to be exceeded in connection with including the current image data in the existing texture atlas wait set. In some embodiments, the determining whether the preset maximum capacity of the existing texture atlas wait set will be exceeded comprises determining the area of the existing texture atlas wait set based at least in part on the one or more dimensions of the existing texture atlas wait set, and determining whether the area of the existing texture atlas wait set exceeds a preset maximum area corresponding to the existing texture atlas wait set. In some embodiments, the determining whether the preset maximum capacity of the existing texture atlas wait set will be exceeded comprises determining a total length and total width of the image data added to the existing texture atlas wait, and determining whether the total length exceeds a preset maximum total length, or whether the total width exceeds a preset maximum total width.

At 130, a texture atlas is created. In some embodiments, the terminal creates the texture atlas. The texture atlas is created in connection with rendering a corresponding image. The texture atlas is created based at least in part on the one or more dimensions of the texture atlas (e.g., the determined one or more dimensions of the texture atlas that are determined based on the dimensions of the image data to be included in the texture atlas). The texture atlas is created in response to determining the dimensions of the texture atlas. For example, in response to determining the dimensions of the texture atlas based on the dimensions of the image data to be used in connection with generating the texture atlas, the terminal can create the texture atlas based at least in part on the determined dimensions. In some embodiments, a render engine uses the texture atlas (or information comprised therein) to render the corresponding scene or image. The render engine can create the texture atlas, and all images (or one or more images) in a set of images are used to generate the texture atlas.

The texture atlas can be created based at least in part on the image data that is determined to be used in connection with creating the texture atlas. For example, the texture atlas is created based at least in part on one or more pieces of image data that are obtained (e.g., in connection with the rendering of the corresponding image).

If only one texture atlas wait set exists (e.g., in response to a determination that a single texture atlas wait set exists for rendering the corresponding image), then a texture atlas is created with respect to the existing texture atlas wait set. If a plurality of texture atlas wait sets exist (e.g., in response to a determination that a plurality of texture atlas wait sets comprise image data for rendering the corresponding image), then a plurality of texture atlases can be created with respect to the plurality of texture atlas wait sets. In some embodiments, a texture atlas is created for each texture atlas wait set that is determined to comprise image data for the rendering of the corresponding image. In some embodiments, a texture atlas is created on a one-to-one ratio with respect to texture atlas wait sets comprising image data corresponding to an image to be rendered.

In some embodiments, the creating of the texture atlas comprises creating a texture atlas object, requesting memory space, and setting the texture coordinates for the various pieces of image data comprised in the texture atlas. The texture coordinates can be used to render the image or scene. In some embodiments, the texture atlas object corresponds to a texture of the image to be rendered. The texture atlas object can correspond to a combination of a plurality of small images.

In response to the texture atlas being created, the texture atlas wait set corresponding to the texture atlas is to be deleted. The deletion of the texture atlas wait set frees up the memory space occupied by the texture atlas wait set. The texture atlas wait set corresponding to the created texture atlas is the texture atlas wait set comprising image data that is to be added to the texture atlas. The texture atlas wait set can be deleted in response to a determination that the creating of the texture atlas is complete.

Figure 2:
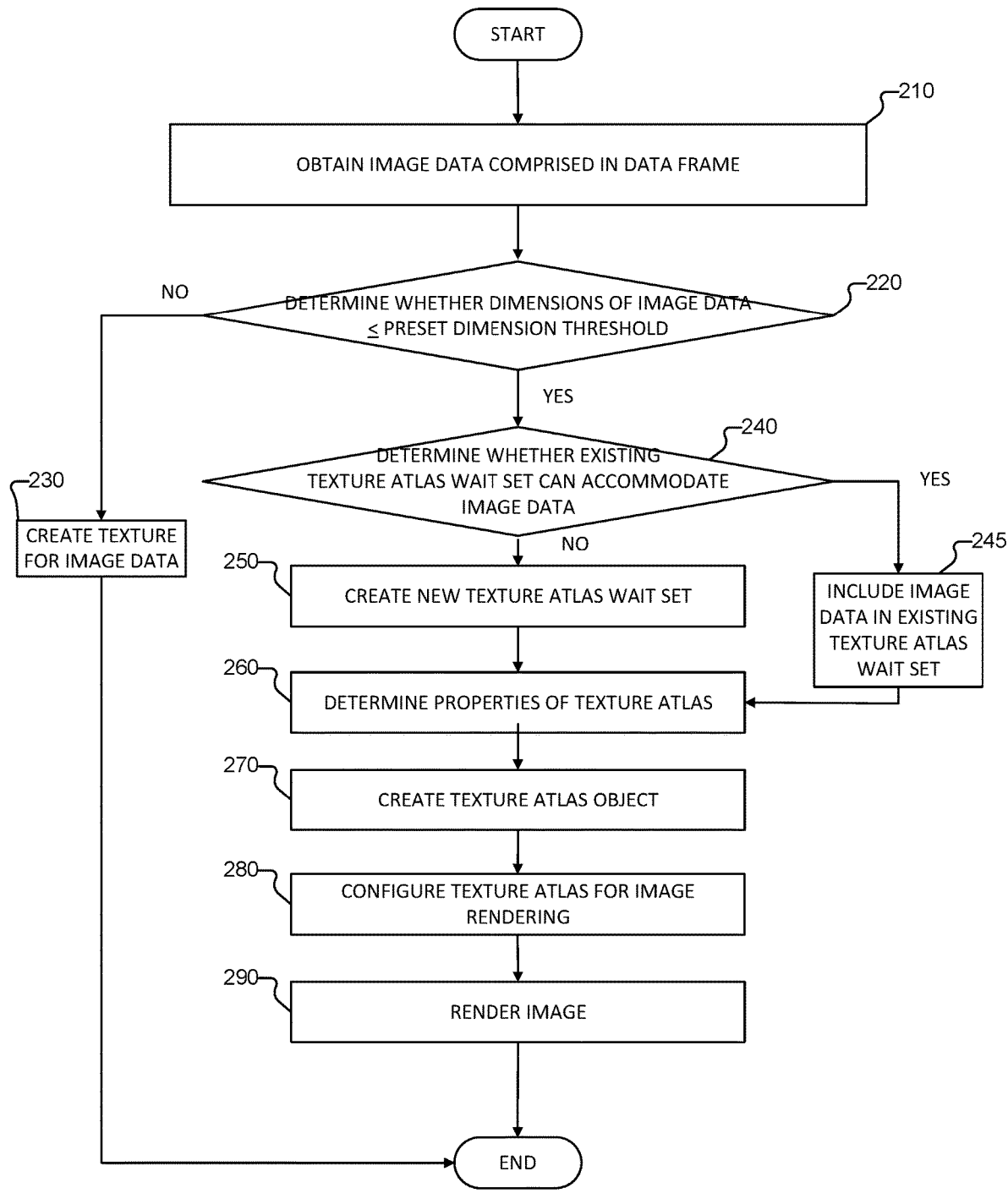
FIG. 2 is a flowchart of a method for rendering an image according to various embodiments of the present application.

FIG. 2 is a flowchart of a method for rendering an image according to various embodiments of the present application.

Referring to FIG. 2, process 200 for rendering an image is provided. Process 200 can be implemented in connection with process 100 of FIG. 1, texture atlas wait set 300 of FIG. 3A, texture atlas wait set 325 of FIG. 3B, and/or texture atlas wait set 350 of FIG. 3C. Process 200 can be implemented at least in part by computer system 400 of FIG. 4. For example, process 200 can be implemented at least in part by an application or process running on computer system 400 of FIG. 4.

According to various embodiments, process 200 is invoked in response to determining that an image is to be rendered. In some embodiments, process 200 is invoked in connection with the process of rendering the image.

At 210, image data comprised in a data frame is obtained. The image can be a local image file (e.g., a local png/jpeg file), or an image obtained from a link (e.g., a URL from a web page, etc.). The image can be read or obtained from the location corresponding to the file (e.g., the local address at which the image is stored, or the link associated with the remote address of the image). The data frame can correspond to an image to be displayed by a terminal. In some embodiments, the image data that is obtained corresponds to image data that is used in connection with rendering the data frame (e.g., the corresponding image). The image data comprised in the data frame can be obtained from the corresponding image file. In some embodiments, the image data comprised in the data frame is obtained in connection with the terminal rendering the image. For example, in response to the terminal determining that an image is to be displayed, the terminal can obtain an image corresponding to the image, and can obtain the image data comprised in the data frame. The terminal can determine that an image is to be displayed based on an input received from a user, an instruction obtained from an application running on the terminal, etc.

According to various embodiments, a data frame to be rendered comprises a plurality of pieces of image data. As an example, one or more are included on a particular user interface (UI) to be rendered, and each icon included in the UI can correspond to one piece of image data. In some embodiments, the obtaining of the image data comprised in a data frame comprises obtaining image data for each object to be displayed on a screen of the terminal (e.g., each object or element provided on a user interface, etc.).

According to various embodiments, 220, 230, 240, 245, and 250 of process 200 are performed for each piece of image data. For example, 220, 230, 240, 245, and 250 of process 200 are performed for each piece of image data corresponding to an image to be rendered.

At 220, a determination is made as to whether one or more dimensions of image data are less than or equal to a preset dimension threshold. In some embodiments, the one or more dimensions can correspond to an image size. In some embodiments, the terminal determines whether the one or more dimensions of image data are less than or equal to a preset dimension threshold in response to the terminal obtaining image data comprised in a data frame (or in an image). According to various embodiments, the determination of whether the one or more dimensions of the image data are less than or equal to the preset dimension threshold is performed for each piece of image data that is obtained from the data frame (e.g., the image). For example, the determination of whether the one or more dimensions of image data are less than or equal to the preset dimension threshold is performed for current image data.

According to various embodiments, the preset dimension threshold (e.g., used in connection with determining the image data to be used to create the texture atlas) can be configurable. For example, the preset dimension threshold can be set according to a processing efficiency (e.g., a speed with which an image is desired to be rendered, a threshold time within which the image is desired to be rendered, etc.). The preset dimension threshold can be configured based at least in part on one or more of manufacturer settings of the terminal, developer settings of an application running on the terminal, and user settings or preferences.

In some embodiments, 220 of process 200 comprises determining whether the one or more dimensions of the image data (e.g., the current image data) [meet?] a condition associated with the preset dimension threshold.

According to various embodiments, a texture atlas is used to reduce the waste of memory resulting from the creating of a texture of each piece of image data, particularly image data with relatively small dimensions. However, for image data (e.g., images) having dimensions that are relatively very large, after the image data is included in the texture atlas, the image data fills the texture atlas. Accordingly, image data that exceeds certain dimensions does not need to be placed in the texture atlas (e.g., because the insertion of image data that fills up a texture atlas at least partially obviates the benefits derived from using a texture atlas to avoid creating a texture for individual pieces of image data). In some embodiments, the preset dimension threshold can be set in advance. In response to a determination that the dimensions of a piece of image data exceed the preset dimension threshold, the piece of image data can be deemed as unnecessary to place in the texture atlas. An empirical value can be used for the preset dimension threshold. For example, the preset dimension threshold can be set as 512 pixels. As another example, the preset dimension threshold is configurable by the user. An interface can be provided to the user to receive the dimension threshold setting provided by the user through the interface.

In response to determining that the one or more dimensions of the image data (e.g., the current image data) are greater than the preset dimension threshold (e.g., not less than or equal to the preset dimension threshold) at 220, process 200 proceeds to 230 at which texture for the image data (e.g., the current image data) is created. In some embodiments, the texture for the current image data is created according to one or more conventional texture creation technologies. As an example, for image data having relatively large dimensions, texture corresponding to such image data is created.

The creating of texture for such image data can comprise processing the image as a standalone texture object. An image processed as a standalone texture object can be a normal texture object. The creating of the texture for such image data can comprise requesting memory space, and uploading the image data to memory. Conventional methods of creating texture can be used for the image data (e.g., the current image data). Such conventional methods are not described in detail here. Process 200 with respect to the current image data can end after the texture is created for the current data (and process 200 can be performed with respect to other image data obtained from the data frame).

In response to determining that the one or more dimensions of the image data (e.g., the current image data) are less than or equal to the preset dimension threshold at 220, process 200 proceeds to 240 at which a determination is made as to whether an existing texture atlas wait set can accommodate image data. In some embodiments, the terminal determines whether an existing texture atlas wait set can accommodate the current image data (e.g., a piece of image data obtained from the data frame). The terminal can determine whether the existing texture atlas wait set can accommodate the current image data based at least in part on one or more dimensions of the current image data and/or an available capacity of the existing texture atlas wait set.

According to various embodiments, one or more texture atlas wait sets can be established for each data frame. For example, one texture atlas wait set can be established for each data frame, or a plurality of texture atlas wait sets can be established. A texture atlas wait set corresponding to a data frame can be established in connection with the processing of the rendering of the data frame. A maximum capacity can be set for each texture atlas wait set. In some embodiments, the maximum capacity can be an area (e.g., defined by a height and width). If one texture atlas wait set is filled (e.g., if the texture atlas wait set has no remaining capacity for additional image data), then the remaining image data corresponding to a data frame can be placed in another texture atlas wait set (or a plurality of other texture wait sets).

If an existing texture atlas wait set can accommodate the current image, then the current image is placed in this existing texture atlas wait set. For example, the terminal can determine a capacity of the existing texture atlas wait set (or remaining or available capacity of the existing texture atlas wait set), and determine whether a size of the current image is smaller than or equal to the available capacity of the existing texture atlas wait set. In response to determining that the available capacity of the existing texture atlas wait set is sufficient for the current image (e.g., that the current image is smaller than or the same size as an available capacity of the existing texture atlas wait set), the current image is included in the existing texture atlas wait set.

According to various embodiments, determining whether an existing texture atlas wait set can accommodate image data comprises including the image data in the existing texture atlas wait set and determining whether the existing texture atlas wait set (e.g., comprising the current image data) exceeds a preset maximum capacity for the existing texture atlas wait set. If the existing texture atlas wait set (e.g., comprising the current image data) exceeds a preset maximum capacity for the existing texture atlas wait set, then the existing texture atlas wait set can be deemed to not be able to accommodate the image data (e.g., the current image data). If the existing texture atlas wait set (e.g., comprising the current image data) does not exceed a preset maximum capacity for the existing texture atlas wait set, then the existing texture atlas wait set can be deemed to be able to accommodate the image data (e.g., the current image data).

In response to determining that the existing texture atlas wait set can accommodate the image data (e.g., the current image data) at 240, process 200 can proceed to 245 at which the image data is included in the existing texture atlas wait set. For example, the terminal can include the current image data in the existing texture atlas wait set corresponding to the data frame in response to determining that the existing texture atlas wait set has sufficient available capacity for the current image data. In response to the image data (e.g., the current image data) being included in the existing texture atlas wait set at 245, process 200 proceeds to 260.

According to various embodiments, the including the image data (e.g., the current image data) in the existing texture atlas wait set comprises including the image data into the existing texture atlas wait set as a sub-texture. A sub-texture can be a texture that is part of another larger texture.

Process 200 can proceed to 260 with respect to the existing texture atlas wait set when the existing texture atlas wait set is full. For example, in response to a determination that the existing texture atlas wait set has no remaining available capacity, process 200 proceeds to 260 with respect to the existing texture atlas wait set. In some embodiments, the existing texture atlas wait set is deemed to be full in response to a determination that an available capacity of the existing texture atlas wait set is less than a preset capacity threshold. In some embodiments, if, after including the current image data in the existing texture atlas wait set, the existing texture atlas wait set is determined to have available capacity remaining (or that the existing texture atlas wait set is not deemed full), process 200 can return to 210 or 220 with respect to a next image data (not shown).

In response to determining that the existing texture atlas wait set cannot accommodate the image data (e.g., the current image data) at 240, process 200 can proceed to 250 at which the a new texture atlas wait set is created.

In response to determining that the available capacity of the existing texture atlas wait set is not sufficient for the current image (e.g., that the current image is larger than an available capacity of the existing texture atlas wait set), the current image is not included in the existing texture atlas wait set. In some embodiments, a subset of the image data corresponding to the current image is included in the existing texture atlas wait set. For example, an available capacity of the existing texture atlas wait set can be filled with a subset of image data corresponding to the current image. In some embodiments, in response to determining that the available capacity of the existing texture atlas wait set is not sufficient for the current image (e.g., that the current image is larger than an available capacity of the existing texture atlas wait set), a new texture atlas wait set is created. The new texture atlas wait set can be created in response to determining that the existing texture atlas wait set is filled (e.g., has reached capacity). A subset of the image data corresponding to the current image (e.g., a set of image data that cannot fit within the existing texture atlas wait set) is included in the new texture atlas wait set. According to various embodiments, the use of an existing texture atlas wait set conserves memory resources.

According to various embodiments, one or more texture atlas wait sets can be established for each data frame. For example, one texture atlas wait set can be established for each data frame, or a plurality of texture atlas wait sets can be established. A texture atlas wait set corresponding to a data frame can be established in connection with the processing of the rendering of the data frame. A maximum capacity can be set for each texture atlas wait set. If one texture atlas wait set is filled (e.g., if the texture atlas wait set has no remaining capacity for additional image data), then the remaining image data corresponding to a data frame can be placed in another texture atlas wait set (or a plurality of other texture wait sets).

According to various embodiments, before the texture atlas is created, the dimensions of the image data that is to be included in the texture atlas (e.g., the current image data) are determined (e.g., computed). Accordingly, the image data is placed in a texture atlas wait set. Each texture atlas wait set can correspond to one texture atlas. For example, texture atlas wait sets can correspond to texture atlases on a one-to-one basis. In some embodiments, a separate texture atlas is created for each texture atlas wait set.

The texture atlas wait sets exist in internal memory. According to various embodiments, texture atlas wait sets are filled in a manner to conserve memory. For example, the texture atlas wait sets can be filled as much as possible. The texture atlas wait sets can be filled according to a determined optimal capacity based at least in part on dimensions of image data to be included in a texture atlas wait set. The determined optimal capacity can correspond to 80% of the area of the texture atlas wait set (e.g., a capacity of the texture atlas wait set). In some embodiments, a texture atlas wait set filled according to a determined optimal capacity is filled to comprise image data that is at least 80% of the capacity (e.g., the maximum capacity) of the texture atlas wait set. In some embodiments, a single texture atlas wait set can be used for the image data comprised in one data frame. In some embodiments, a plurality of texture atlas wait sets are used to hold the image data corresponding to the data frame. A texture atlas wait set can have a maximum capacity (e.g., an upper limit of capacity). As an example, the maximum capacity of a texture atlas wait set can be based at least in part on an amount of memory allocated to the texture atlas wait set. In some embodiments, the image data comprised in multiple data frames can share a texture atlas wait set. For example, a texture atlas wait set can hold image data corresponding to different data frames.

According to various embodiments, in response to creating the new texture atlas wait set, the image data (e.g., the current image data) is included in the new texture atlas wait set.

Process 200 can proceed to 260 with respect to the new texture atlas wait set when the new texture atlas wait set is full. For example, in response to a determination that the new texture atlas wait set has no remaining available capacity, process 200 proceeds to 260 with respect to the new texture atlas wait set. In some embodiments, the new texture atlas wait set is deemed to be full in response to a determination that an available capacity of the new texture atlas wait set is less than or equal to a preset capacity threshold. In some embodiments, if, after including the current image data in the new texture atlas wait set, the new texture atlas wait set is determined to have available capacity remaining (or that the new texture atlas wait set is not deemed full), process 200 can return to 210 or 220 with respect to a next image data.

Figure 3A:
FIGS. 3A-3C are schematic diagrams of various texture atlas wait sets according to various embodiments of the present application.
Figure 3B:
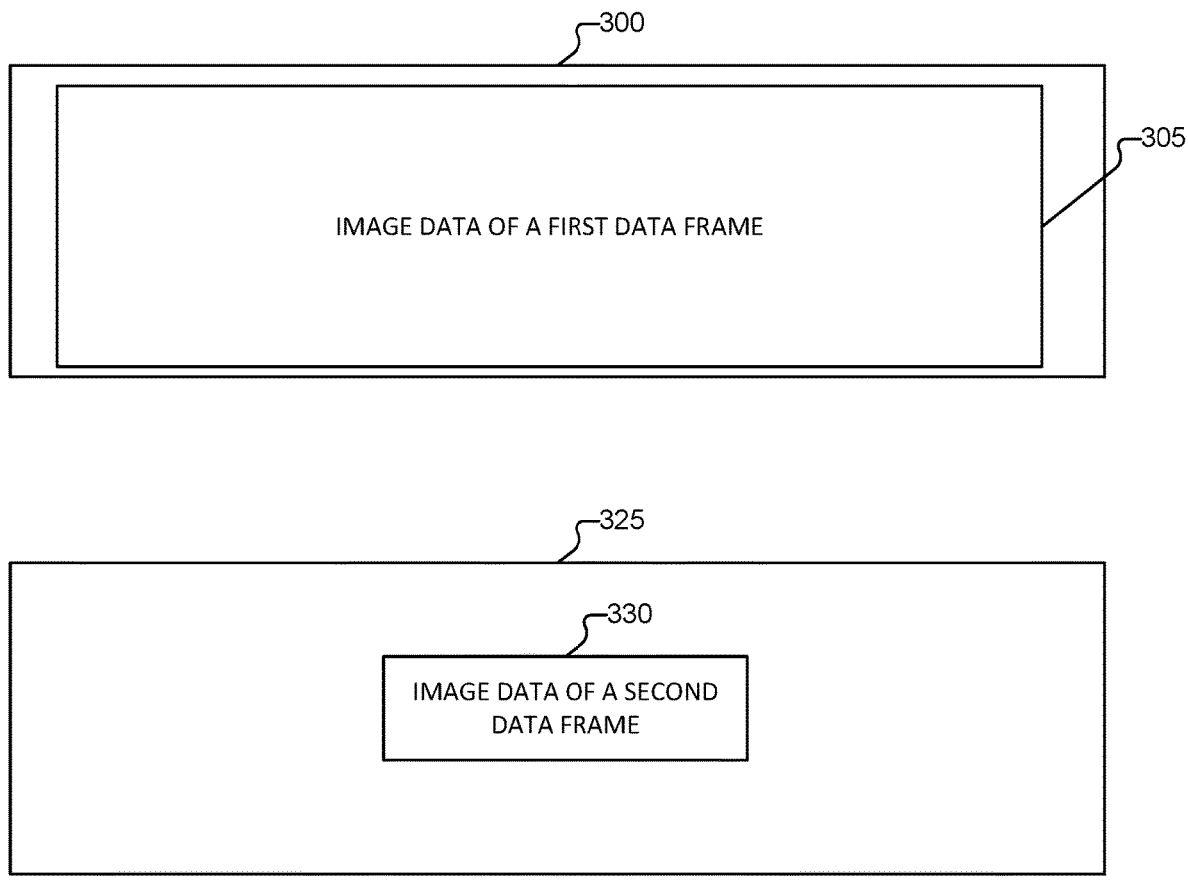
Figure 3C:
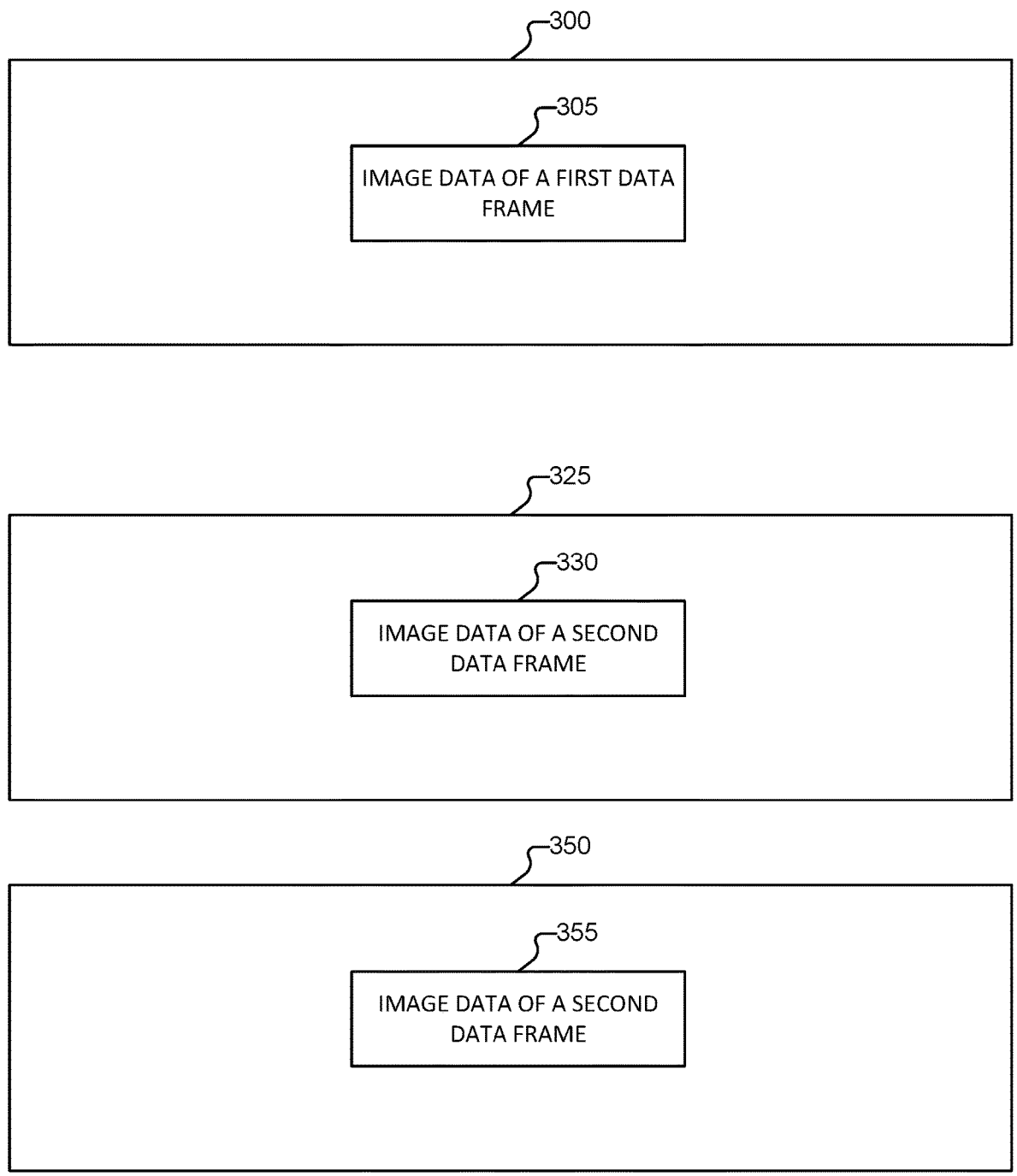

FIGS. 3A-3C are schematic diagrams of various texture atlas wait sets according to various embodiments of the present application.

Referring to FIGS. 3A, 3B, and 3C, texture atlas wait set 300, texture atlas wait set 325, and texture atlas wait set 350 are provided. Texture atlas wait set 300, texture atlas wait set 325, and/or texture atlas wait set 350 can be implemented in connection with process 100 of FIG. 1 and/or process 200 of FIG. 2. Texture atlas wait set 300, texture atlas wait set 325, and/or texture atlas wait set 350 can be implemented at least in part by computer system 400 of FIG. 4.

As illustrated in FIG. 3A, texture atlas wait set 300 is provided. As shown, the texture atlas wait set 300 includes image data corresponding to a first data frame 305 and image data corresponding to a second data frame 310. For example, if the image data corresponding to a first data frame 305 has already been included in texture atlas wait set 300, and texture atlas wait set 300 is not yet full, then additional image data can be included in the texture atlas wait set 300. For example, in response to image data corresponding to a second data frame 310 being obtained from the second data frame, with respect to the obtained image data (e.g., image data corresponding to a second data frame 310), a determination can be made as to whether texture atlas wait set 300 can accommodate image data corresponding to a second data frame 310. In response to determining that texture atlas wait set 300 can accommodate image data corresponding to a second data frame 310, image data corresponding to a second data frame 310 is included in texture atlas wait set 300. After image data corresponding to a second data frame 310 is included in texture atlas wait set 300, if texture atlas wait set 300 is full, then the subsequent step to create a texture atlas object can be performed.

As illustrated in FIG. 3B, texture atlas wait set 325 is provided. As shown, the texture atlas wait set 325 includes image data corresponding to a second data frame 330. Texture atlas wait set 300 can comprise image data corresponding to a first data frame 305. For example, if the image data corresponding to a first data frame 305 has already been included in texture atlas wait set 300, and texture atlas wait set 300 is full, then additional image data cannot be included in the texture atlas wait set 300. In response to determining that texture atlas wait set 300 cannot accommodate image data corresponding to a second data frame 330, a new texture atlas wait set can be created. For example, texture atlas wait set 325 is created. The image data of the second data frame 330 can be included in the texture atlas wait set 325 that is created. In some embodiments, image data corresponding to the second data frame 330 corresponds to a subset of data of the second frame (e.g., the image data comprised in the texture atlas wait set 325 is a subset of all data of the second frame). The image data corresponding to the second data frame 330 is included in the texture atlas wait set 325 in response to determining that texture atlas wait set 300 cannot accommodate any additional image data or that the texture atlas wait set 300 cannot accommodate image data of the second frame. In some embodiments, the image data contained in the second data frame is obtained, no texture atlas wait set that can accommodate the image data contained in the second data frame exists, so a new texture atlas wait set 325 is created, and the image data of the second data frame is placed in the texture atlas wait set 325.

As illustrated in FIG. 3C, texture atlas wait set 350 is provided. The texture atlas wait set 350 includes image data corresponding to a second data frame 355. Texture atlas wait set 300 includes image data corresponding to a first data frame 305, and/or texture atlas wait set 325 includes image data corresponding to a second data frame 330. In some embodiments, image data corresponding to a second data frame 330 and image data corresponding to a second data frame 355 are respectively subsets of image data obtained from the second data frame. As an example, in connection with obtaining the image data corresponding to the second data frame and including the image data corresponding to the second data frame in a texture atlas wait set, the texture atlas wait set 325 is deemed to not to be able to accommodate certain image data corresponding to the second frame. For example, the terminal can determine that texture atlas wait set 325 cannot accommodate image data corresponding to second data frame 355. In response, a new texture atlas wait set 350 can be created and the image data corresponding to the second data frame 355 is included in the texture atlas wait set 350. In some embodiments, the terminal determines that a portion of the image data corresponding to the second data frame (e.g., image data corresponding to second data frame 330) can be included in the texture atlas wait set 325, but that another portion of the image data corresponding to the second data frame (e.g., image data corresponding to second data frame 355) cannot be accommodated in the texture atlas wait set 325, and in response to such a determination, a new texture atlas wait set (e.g., texture atlas wait set 350) is created, and the portion of image data corresponding to the second data frame that could not be accommodated in texture atlas wait set 325 (e.g., image data corresponding to second data frame 330) is included in the new texture atlas wait set. In some embodiments, the texture atlas wait set 325 can be deemed unable to accommodate another portion of the image data corresponding to the second data frame (e.g., image data corresponding to second data frame 355) based at least in part on dimensions of the other portion of the image data corresponding to the second data frame and/or an available capacity of the texture atlas wait set 325. In some embodiments, if after the texture atlas wait set 350 is created (e.g., to include image data corresponding to the second data frame 355) the terminal obtains image data corresponding to the second data frame for which the texture atlas wait set 325 can accommodate, then such image data corresponding to the second data frame is included in the texture atlas wait set 325.

According to various embodiments, the filling of the texture atlas wait set is used in connection with invoking (e.g., triggering) creation of the texture atlases for each texture atlas wait set. For example, in response to determining that an available capacity of a texture atlas wait set is below a predefined capacity threshold, the texture atlas wait set is deemed full and creation of the texture atlas can be invoked. In some embodiments, texture atlases can be created periodically. For example, the terminal can periodically invoke (e.g., trigger) creation of one or more texture atlases for corresponding ones of one or more texture atlas wait sets. In some embodiments, the terminal invokes creation of texture atlases based on a combination of a periodic invocation of creating the texture atlases and an invocation of creating texture atlases in response to the filling of the texture atlas wait set. In response to determining that the creation of a texture atlas is complete, the corresponding texture atlas wait set is deleted from memory.

In some embodiments, a texture atlas wait set can be deemed full even if the texture atlas wait set has available capacity remaining. For example, a texture atlas wait set being deemed full does not mean that the texture atlas wait set has no remaining space. A texture atlas wait set deemed as being full can have remaining space (e.g., available capacity) that is less than a preset space threshold, or the remaining space as a proportion of the total space in the texture atlas wait set is less than a preset proportion threshold, etc.

Returning to FIG. 2, at 260, properties of a texture atlas are determined. In some embodiments, the properties of the texture atlas that are determined comprise the dimensions of the texture atlas. In some embodiments, a texture atlas is created for each texture atlas wait set corresponding to a data frame or image to be rendered. Accordingly, properties of each texture atlas to be created are determined. The terminal can determine the properties of the texture atlas based at least in part on dimensions of the sub-textures comprised in the corresponding texture atlas wait set. For example, the dimensions of image data comprised in a texture atlas wait set are used in connection with determining properties of a corresponding texture atlas.

According to various embodiments, the terminal uses a preset texture merging process in connection with determining the required texture atlas dimensions. The preset texture merging process can also be used in connection with determining the texture coordinates of the various sub-textures contained in the texture atlas. For example, based on the preset texture merging process, the terminal determines properties of the texture atlas, including dimensions of the texture atlas and texture coordinates of the various sub-textures contained in the texture atlas. According to various embodiments, the preset texture merging process merges the sub-textures corresponding to image data obtained from the data frame that is to be rendered. The sub-textures are merged in a manner that the texture atlas efficiently comprises the various sub-textures. For example, the preset texture merging process can provide an optimized texture atlas with respect to memory usage. The sub-textures can be merged to form the texture atlas in a manner that results in a texture atlas using reduced memory resources.

The terminal determines the sub-textures (e.g., corresponding to the image data obtained from the data frame) that are to be added to the texture atlas. The terminal can also determine dimensions of the texture atlas and/or texture coordinates corresponding to the various sub-textures that are to be added to the texture atlas. The determined dimensions of the texture atlas can correspond to dimension requirements for the texture atlas to include the various image data corresponding to the data frame. For example, after the sub-textures to be added to the texture atlas are determined, the texture atlas dimensions and the texture coordinates of the various sub-textures can be determined. Texture atlas dimension requirements and/or the texture coordinates of the various sub-textures can be determined based on the dimensions of the sub-textures to be added to the texture atlas.

The texture merging algorithm used can be any arbitrary method, and is not limited by the present examples. Currently, texture merging algorithms primarily lay out the sub-textures in a texture atlas in a manner that enables the texture atlas to occupy as little memory as possible. Texture merging can be achieved using such two-dimensional image array algorithms such as the MaxRects algorithm, the Guillotine algorithm, or the Skyline algorithm. During the process of implementing the preset texture merging process, the location of each sub-texture (e.g., the texture coordinates of each sub-texture) can be determined.

According to various embodiments, the texture atlas is determined to have dimensions (measured in number of pixels) that are a power of two. For example, because equipment (e.g., rendering devices for terminals, etc.) generally supports power of two dimensions for texture and texture atlases, the texture atlas dimensions determined have a power of two. As an example, the texture atlas has dimensions corresponding to 128×64, 64×32, etc. For equipment capable of supporting texture atlases with dimensions that are not powers of two, the determined texture atlas dimensions do not need to be powers of two. According to various embodiments, the texture atlas is determined based at least in part on capabilities of the terminal such as image processing or rendering capabilities, etc. The dimensions of the texture atlas can be determined based at least in part on the capabilities of the terminal.

At 270, a texture atlas object is created. In some embodiments, a texture atlas object is created for each texture atlas wait set corresponding to a data frame or image to be rendered. The creating the texture atlas object can comprise requesting memory resources (e.g., memory space) for the texture atlas object. For example, in response to determining the properties of the texture atlas, the terminal creates a texture atlas object. The terminal can allocate memory for the texture atlas object in connection with creating the texture atlas object. According to various embodiments, the texture atlas object is an instantiation of the corresponding texture atlas.

According to various embodiments, a texture atlas object is created for each texture atlas set. The texture atlas object corresponds to the texture atlas in memory, and the texture atlas comprises various sub-textures. Accordingly, memory space for this texture atlas object is requested based on the calculated texture atlas dimensions. For example, memory space for the texture atlas object can be requested by invoking the gl TexImage2D function included in the OpenGL ES command set, and the memory space for the texture atlas (e.g., the size of the texture atlas) can be defined using the parameters of this function.

At 280, the texture atlas object is configured for image rendering. For example, the texture atlas object is configured to comprise the sub-textures (e.g., image data) comprised in the corresponding texture atlas wait set. The texture atlas object can be configured based on the sub-textures (e.g., image data) comprised in the corresponding texture atlas wait set (e.g., including based on the texture coordinates of the sub-textures). As an example, the terminal can upload sub-textures comprised in a texture atlas wait set to the memory space allocated for the texture atlas object. As an example, the texture coordinates of the various sub-textures comprised in the texture atlas object are set.

In some embodiments, the uploading the sub-textures to the memory allocated for the texture atlas object comprises storing the sub-textures to the memory allocated for the texture atlas object. As an example, sub-texture data can be uploaded to the memory space allocated for the texture atlas object using the gl TexSubImage2D function in the OpenGL ES command set. The texture coordinates for the various sub-textures determined at 260 can be used to set the texture coordinates of the various sub-textures comprised in the texture atlas object. In some embodiments, the texture coordinates of a sub-texture correspond to the location of the sub-texture in the texture atlas. Because the texture coordinates of a sub-texture correspond to the location of the sub-texture in the texture atlas, when the image is rendered, a sub-texture can be found quickly based on the texture coordinates.

At 290, an image is rendered. The image is rendered based at least in part on the texture atlas (e.g., the texture atlas object created at 270). For example, the created texture atlas is utilized to perform rendering of the images in the corresponding data frame. According to various embodiments, geometric data and texture data are used in connection with rendering an object. Accordingly, a texture atlas corresponding to an object and the texture coordinates for the object are used in connection with rendering the object.

Process 200 can be implemented at least in part by a texture atlas creating device. The texture atlas creating device can be an application located on the terminal. For example, process 200 can be implemented by an application locally running on the terminal. The texture atlas creating device can be a plug-in or a software development kit (SDK) or other functional unit comprised in an application located (e.g., locally installed and/or running) on the terminal. The application can be a system application or a user application. The texture atlas creating device can be located on a server.

According to various embodiments, a texture atlas wait set exists in internal memory. In order to conserve memory as much as possible, the texture atlas wait sets are filled as much as possible. As an example, one texture atlas wait set is used (e.g., required) for the image data comprised in one data frame. As another example, multiple texture atlas wait sets are used (e.g., required) for the image data comprised in one data frame. Generally, texture atlas wait sets have a maximum capacity (e.g., an upper limit of capacity). As another example, the image data comprised in multiple data frames shares a texture atlas wait set (e.g., a texture atlas wait set can hold image data from different data frames).

Figure 4:
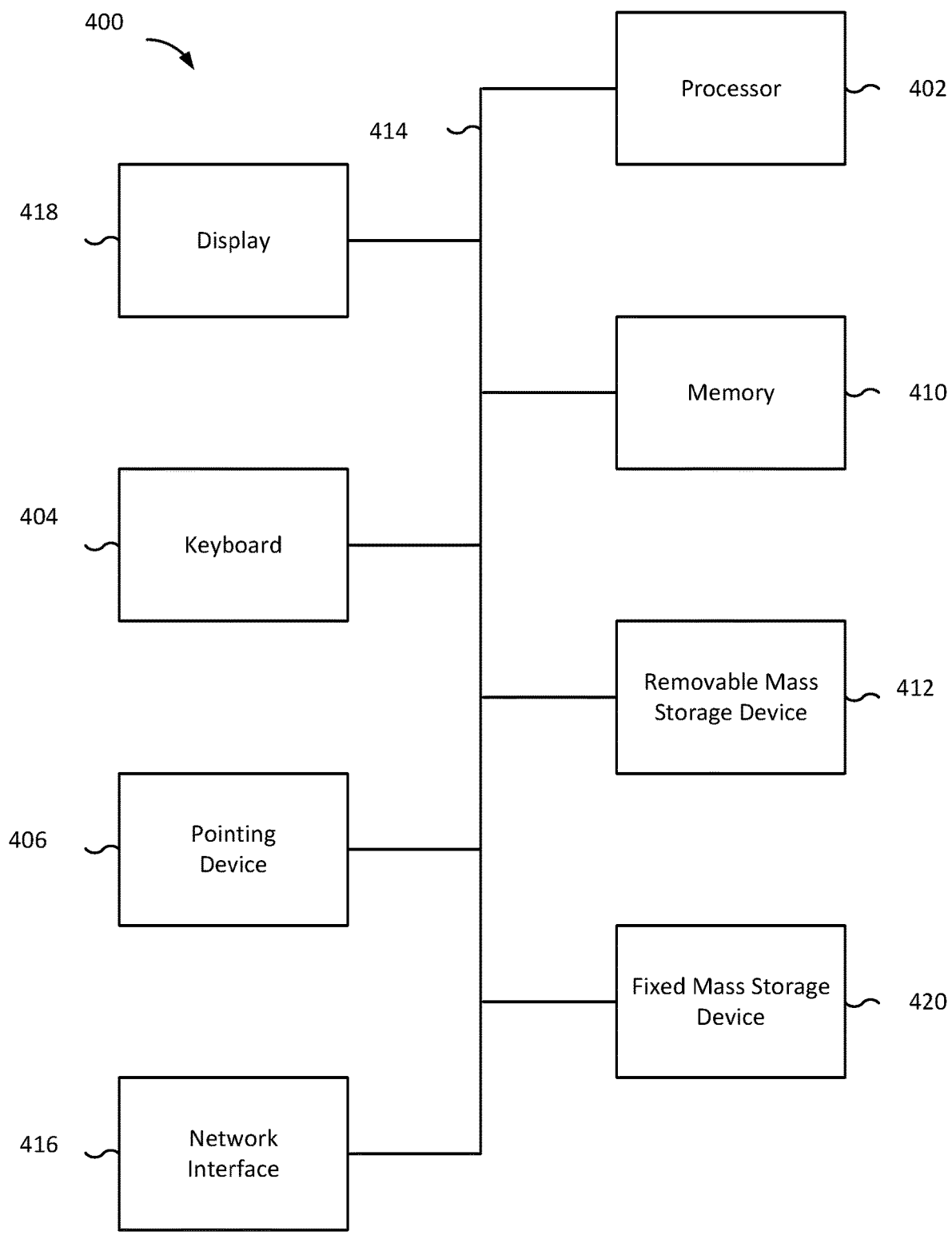
FIG. 4 is a functional diagram of a computer system for creating a texture atlas according to various embodiments of the present application.

FIG. 4 is a functional diagram of a computer system for creating a texture atlas according to various embodiments of the present application.

Referring to FIG. 4, computer system 400 for creating a texture atlas is provided. Computer system 400 can implement at least part of process 100 of FIG. 1, process 200 of FIG. 2, texture atlas wait set 300 of FIG. 3A, texture atlas wait set 325 of FIG. 3B, and/or texture atlas wait set 350 of FIG. 3C.

Computer system 400, which includes various subsystems as described below, includes at least one microprocessor subsystem (also referred to as a processor or a central processing unit (CPU)) 402. For example, processor 402 can be implemented by a single-chip processor or by multiple processors. In some embodiments, processor 402 is a general purpose digital processor that controls the operation of the computer system 400. Using instructions retrieved from memory 410, the processor 402 controls the reception and manipulation of input data, and the output and display of data on output devices (e.g., display 418).

Processor 402 is coupled bi-directionally with memory 410, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 402. Also as is well known in the art, primary storage typically includes basic operating instructions, program code, data, and objects used by the processor 402 to perform its functions (e.g., programmed instructions). For example, memory 410 can include any suitable computer-readable storage media, described below, depending on whether, for example, data access needs to be bi-directional or unidirectional. For example, processor 402 can also directly and very rapidly retrieve and store frequently needed data in a cache memory (not shown). The memory can be a non-transitory computer-readable storage medium.

A removable mass storage device 412 provides additional data storage capacity for the computer system 400, and is coupled either bi-directionally (read/write) or uni-directionally (read only) to processor 402. For example, storage 412 can also include computer-readable media such as magnetic tape, flash memory, PC-CARDS, portable mass storage devices, holographic storage devices, and other storage devices. A fixed mass storage 420 can also, for example, provide additional data storage capacity. The most common example of mass storage 420 is a hard disk drive. Mass storage device 412 and fixed mass storage 420 generally store additional programming instructions, data, and the like that typically are not in active use by the processor 402. It will be appreciated that the information retained within mass storage device 412 and fixed mass storage 420 can be incorporated, if needed, in standard fashion as part of memory 410 (e.g., RAM) as virtual memory.

In addition to providing processor 402 access to storage subsystems, bus 414 can also be used to provide access to other subsystems and devices. As shown, these can include a display monitor 418, a network interface 416, a keyboard 404, and a pointing device 406, as well as an auxiliary input/output device interface, a sound card, speakers, and other subsystems as needed. For example, the pointing device 406 can be a mouse, stylus, track ball, or tablet, and is useful for interacting with a graphical user interface.

The network interface 416 allows processor 402 to be coupled to another computer, computer network, or telecommunications network using a network connection as shown. For example, through the network interface 416, the processor 402 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 402 can be used to connect the computer system 400 to an external network and transfer data according to standard protocols. For example, various process embodiments disclosed herein can be executed on processor 402, or can be performed across a network such as the Internet, intranet networks, or local area networks, in conjunction with a remote processor that shares a portion of the processing. Additional mass storage devices (not shown) can also be connected to processor 402 through network interface 416.

An auxiliary I/O device interface (not shown) can be used in conjunction with computer system 400. The auxiliary I/O device interface can include general and customized interfaces that allow the processor 402 to send and, more typically, receive data from other devices such as microphones, touch-sensitive displays, transducer card readers, tape readers, voice or handwriting recognizers, biometrics readers, cameras, portable mass storage devices, and other computers.

The computer system shown in FIG. 4 is but an example of a computer system suitable for use with the various embodiments disclosed herein. Other computer systems suitable for such use can include additional or fewer subsystems. In addition, bus 414 is illustrative of any interconnection scheme serving to link the subsystems. Other computer architectures having different configurations of subsystems can also be utilized.

Various embodiments can be implemented in the form of computer programs set up and run on equipment (e.g., the terminal). The equipment may comprise one or more processors, and further comprises memory and one or more programs. The one or more programs can be stored in memory, and are executed by the one or more processors described above in connection with implementing the method process and/or device operations.

Various embodiments can be implemented in (or by) the graphics engine at the terminal. For example, the embodiments can be implemented at a system level of the terminal. As an example, a terminal or system level thereof with responsibility for performing graphics rendering of the system-level operating interface implements various embodiments. Various embodiments can be implemented in the graphics engine at an application level of the terminal. For example, various embodiments are implemented at an application with responsibility for performing the graphics rendering of application interfaces.

Various embodiments determine the dimensions of the texture atlas to be created based on the image data comprised in the data frame, and use the dimensions of the texture atlas to create a texture atlas. For example, texture atlases of reasonable dimensions can be created based on actual requirements (e.g., based on the dimensions of the image data for which the texture atlas is created). In contrast to conventional texture atlas methods that are more static, the process for creating a texture atlas according to various embodiments is more dynamic and is better able to conserve memory.

Various embodiments avoid the use of non-texture atlas means for all remaining image data resulting from the capacity limitations of static texture atlases, thereby reducing the number of rendering commands and improving rendering performance.

According to various embodiments, image data of multiple data frames shares a texture atlas wait set, and upon the texture atlas being successfully created, the corresponding texture atlas wait set is deleted, thereby reducing the use of memory and increasing system performance as much as possible.

In the several embodiments offered in the present invention, it should be understood that the disclosed device and method can be realized through other means. For example, the device embodiment described above is merely illustrative; for example, the division of said units is only a logical functional division, and during actual implementation, another division method can be used.

Said units, which are described as discrete components, may or may not be physically separate, and components displayed as units may or may not be physical units, i.e., they can be located in one place, or they can be distributed across multiple network units. Some or all of the units can be selected based on actual needs to realize the purposes of the implementation plan.

In addition, the various functional units in each of the embodiments of the present invention can be integrated in one processing unit, or they can be individual units that exist in a physically separate manner, or two or more units can be integrated into one unit. Integrated units described above can be realized in the form of hardware, or they can be realized in the form of hardware plus software functional units.

The above-described integrated units realized in the form of software functional units can be stored in computer-readable storage media. The above-described software functional units stored in storage media comprise a number of commands intended to cause a set of computer equipment (which can be a personal computer, a server, or network equipment) or a processor to execute some of the steps of the method described in the individual embodiments of the present invention. And the aforesaid storage media include: various types of media that can store program code, such as U-disks, removable hard drives, read-only memory (ROM), random access memory (RAM), magnetic disks, or compact disks.

The descriptions above are only preferred embodiments of the present invention, and are not intended to limit the present invention; any revisions, equivalent replacements, or improvements made within the spirit and principles of the present invention should all be included in the scope of protection of the present invention.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
    obtaining, by one or more processors, image data comprised in a data frame to be rendered, the image data comprising data for a plurality of objects in the data frame;
    determining, by the one or more processors, a first set of the plurality of objects to be rendered using a texture atlas, and a second set of the plurality of objects to be rendered from the corresponding image data without use of the texture atlas, the determining of the first set and the second set comprising determining, for an object in the plurality of objects in the data frame, whether the image data for the corresponding object exceeds a preset size threshold;
    determining, by the one or more processors, one or more dimensions for the texture atlas based at least in part on one or more dimensions of the image data for the first set of the plurality of objects;
    creating, by the one or more processors, the texture atlas based at least in part on the determined dimensions; and
    rendering, by the one or more processors, the data frame based at least in part on the texture atlas.

2. The method of claim 1, wherein the obtaining of the image data comprised in the data frame to be rendered comprises:
    obtaining image data to be added to the texture atlas from among the image data comprised in the data frame to be rendered.

3. The method of claim 2, wherein the obtaining of the image data to be added to the texture atlas comprises:
    determining the image data to be added to the texture atlas based at least in part on the one or more dimensions of the image data comprised in the data frame.

4. The method of claim 3, wherein the determining the image data to be added to the texture atlas based at least in part on the one or more dimensions of the image data comprised in the data frame comprises:
    determining the image data to be added to the texture atlas based at least in part on determining one or more image data that respectively have one or more dimensions less than or equal to a preset dimension threshold, the one or more image data being determined from among the image data comprised in the data frame to be rendered.

5. The method of claim 2, further comprising:
    obtaining image data that is not to be added to the texture atlas from among the image data comprised in the data frame to be rendered; and
    creating texture with respect to the image data that is not to be added to the texture atlas.

6. The method of claim 5, further comprising:
    determining, with respect to a piece of image data to be added to the texture atlas, whether an existing texture atlas wait set can accommodate the piece of image data;
    in response to determining that the existing texture atlas wait set can accommodate the piece of image data, placing the piece of image data in the existing texture atlas wait set; and
    in response to determining that the existing texture atlas wait set cannot accommodate the piece of image data, creating a new texture atlas wait set, and placing the piece of image data in the new texture atlas wait set.

7. The method of claim 6, wherein the creating the texture atlas comprises creating a separate texture atlas with respect to each texture atlas wait set.

8. The method of claim 6, the determining, with respect to a piece of image data to be added to the texture atlas, whether an existing texture atlas wait set can accommodate the piece of image data comprises:
    determining, after the piece of image data is added to the existing texture atlas wait set, whether at least one of the one or more dimensions of the image data contained in the existing texture atlas wait set exceed a preset maximum capacity corresponding to the existing texture atlas wait set; and
    in response to determining that the dimensions of the image data contained in the existing texture atlas wait set do not exceed the preset maximum capacity, determining that the existing texture atlas wait set can accommodate the piece of image data.

9. The method of claim 8, wherein the determining whether the images at least one of the one or more dimensions of the image data contained in the existing texture atlas wait set exceed the preset maximum capacity corresponding to the existing texture atlas wait set comprises:
    determining an area of the existing texture atlas wait set based at least in part on the one or more dimensions of the existing texture atlas wait set; and
    determining whether the area of the existing texture atlas wait set exceeds a preset maximum area corresponding to the existing texture atlas wait set.

10. The method of claim 8, wherein the determining whether the images at least one of the one or more dimensions of the image data contained in the existing texture atlas wait set exceed the preset maximum capacity corresponding to the existing texture atlas wait set comprises:
    determining a total length and total width of the image data added to the existing texture atlas wait; and
    determining whether the total length exceeds a preset maximum total length, or whether the total width exceeds a preset maximum total width.

11. The method of claim 6, further comprises:
    in response to creating the texture atlas, deleting the texture atlas wait set corresponding to the texture atlas.

12. The method of claim 1, further comprising:
    including the obtained image data in a texture atlas wait set,
    wherein the determining the one or more dimensions of the texture atlas comprises:

determining the dimensions of the texture atlas based at least in part on dimensions of the image data comprised in the texture atlas wait set.

13. The method of claim 1, wherein the determining the one or more dimensions of the texture atlas to be created comprises:
determining required texture atlas dimensions based at least in part on a preset texture merging process.

14. The method of claim 13, wherein the determining the required texture atlas dimensions comprises:
determining a smallest texture atlas dimension requirement, and the one or more texture atlas dimensions being a power of two.

15. The method of claim 1, wherein the creating the texture atlas comprises:
creating a texture atlas object;
requesting memory space to be allocated for the texture atlas object based on the one or more dimensions of the texture atlas; and
uploading the obtained image data to the memory space allocated for the texture atlas object.

16. The method of claim 1, further comprises:
determining texture coordinates for a piece of image data to be comprised in the texture atlas,
wherein the creating the texture atlas comprises: setting the texture coordinates for the piece of image data contained in the texture atlas.

17. The method of claim 1, wherein the rendering the data frame comprises using the texture atlas in connection with rendering of images comprised in the data frame.

18. The method of claim 1, wherein the rendering the data frame comprises:
rendering, by the one or more processors, the first set of the plurality of objects based at least in part on the texture atlas, wherein a respective size of image data for objects within the first set of the plurality of objects is less than the preset size threshold; and
rendering, by the one or more processors, the second set of the plurality of objects without using the texture atlas, wherein a respective size of image data for objects within the second set of the plurality of objects exceeds the preset size threshold.

19. A device, comprising:
one or more processors configured to:
obtain image data comprised in a data frame to be rendered, the image data comprising data for a plurality of objects in the data frame;
determine a first set of the plurality of objects to be rendered using a texture atlas, and a second set of the plurality of objects to be rendered from the corresponding image data without use of the texture atlas, the determining of the first set and the second set comprising determining, for an object in the plurality of objects in the data frame, whether the image data for the corresponding object exceeds a preset size threshold;
determine one or more dimensions for the texture atlas based at least in part on one or more dimensions of the image data for the first set of the plurality of objects;
create the texture atlas based at least in part on the determined dimensions; and
render the data frame based at least in part on the texture atlas; and
one or more memories coupled to the one or more processors, configured to provide the one or more processors with instructions.

20. The device of claim 19, wherein:
to obtain the image data comprised in the data frame to be rendered comprises obtaining image data to be added to the texture atlas from among the image data comprised in the data frame to be rendered; and
the obtaining of the image data to be added to the texture atlas comprises determining the image data to be added to the texture atlas based at least in part on the one or more dimensions of the image data comprised in the data frame.

21. The device of claim 20, wherein the one or more processors are further configured to:
obtain image data that is not to be added to the texture atlas from among the image data comprised in the data frame to be rendered; and
create texture with respect to the image data that is not to be added to the texture atlas.

22. The device of claim 19, wherein the one or more processors are further configured to:
include the obtained image data in a texture atlas wait set,
wherein to determine the one or more dimensions of the texture atlas comprises:
determining the dimensions of the texture atlas based at least in part on dimensions of the image data comprised in the texture atlas wait set.

23. A computer program product, the computer program product being embodied in a non-transitory computer readable storage medium and comprising computer instructions for:
obtaining, by one or more processors, image data comprised in a data frame to be rendered, the image data comprising data for a plurality of objects in the data frame;
determining, by the one or more processors, a first set of the plurality of objects to be rendered using a texture atlas, and a second set of the plurality of objects to be rendered from the corresponding image data without use of the texture atlas, the determining of the first set and the second set comprising determining, for an object in the plurality of objects in the data frame, whether the image data for the corresponding object exceeds a preset size threshold;
determining, by the one or more processors, one or more dimensions for the texture atlas based at least in part on one or more dimensions of the image data for the first set of the plurality of objects;
creating, by the one or more processors, the texture atlas based at least in part on the determined dimensions; and
rendering, by the one or more processors, the data frame based at least in part on the texture atlas.

* * * * *